(12) United States Patent
Li

(10) Patent No.: US 6,622,749 B2
(45) Date of Patent: Sep. 23, 2003

(54) AIR FAUCET

(75) Inventor: Hsin Yeh Li, Taichung Hsien (TW)

(73) Assignee: Feng Yi Outdoor Leisure Equipment Enterprise Co., Ltd., Taichung Hsien (TW)

( * ) Notice: Subject to any disclaimer, the term of this patent is extended or adjusted under 35 U.S.C. 154(b) by 84 days.

(21) Appl. No.: 09/984,476

(22) Filed: Oct. 30, 2001

(65) Prior Publication Data

US 2003/0079778 A1 May 1, 2003

(51) Int. Cl.⁷ .............................................. F16K 15/20
(52) U.S. Cl. .................... 137/230; 137/223; 251/83; 5/706
(58) Field of Search ................................. 137/223, 226, 137/230; 251/82, 83; 5/706

(56) References Cited

U.S. PATENT DOCUMENTS

| | | | | |
|---|---|---|---|---|
| 66,706 A | * | 7/1867 | Hamilton | 5/712 |
| 210,766 A | * | 12/1878 | Duffy | 251/83 |
| 291,818 A | * | 1/1884 | Tudor | 251/276 |
| 372,503 A | * | 11/1887 | Wheeler | 251/83 |
| 447,211 A | * | 2/1891 | Thomson | 251/83 |
| 526,176 A | * | 9/1894 | Blair | 251/83 |
| 600,360 A | * | 3/1898 | Crane | 251/83 |
| 923,808 A | * | 6/1909 | Breth et al. | 251/83 |
| 1,146,723 A | * | 7/1915 | Losh | 251/83 |
| 1,679,898 A | * | 8/1928 | Gilbert | 251/83 |
| 2,987,071 A | * | 6/1961 | Haus | 137/230 |
| 5,267,363 A | * | 12/1993 | Chaffee | 5/710 |
| 5,367,726 A | * | 11/1994 | Chaffee | 5/706 |
| 5,735,504 A | * | 4/1998 | Walters | 251/83 |
| 5,941,272 A | * | 8/1999 | Feldman | 137/223 |

* cited by examiner

*Primary Examiner*—John Rivell
(74) *Attorney, Agent, or Firm*—Rosenberg, Klein & Lee

(57) ABSTRACT

An improved air faucet allows an air mattress to be squeezed and deflated without sucking air during air discharging process. The air faucet includes an air duct coupled to a base seat. The air duct has an external screw section formed on a middle section to engage with an internal screw section of a valve cap. The air duct has an air inlet. The valve cap has air apertures formed on a top end and a jutting strut extending downwards in the center. The jutting strut has an indented recess formed at the bottom end and an opening in the center for holding a control valve. The control valve couples with a spring and has a bottom end fastened to a valve cock. The valve cap and air duct may be engaged in various manners to control the communication or sealing between the air apertures of the valve cap and air inlet of the air duct.

7 Claims, 7 Drawing Sheets

AIR FAUCET

BACKGROUND OF THE INVENTION

1. Field of the Invention

The invention relates to an improved air faucet and particularly an air faucet that allows air mattress to release air during deflating and folding without sucking air and inflating.

2. Description of the Prior Art

A conventional inflation air faucet 10 as shown in FIG. 1 mainly includes an air duct 12 coupling with an opening 111 of a base seat 11 which is bonded to an inflatable air mattress 14. The air duct 12 has external screw threads 121 formed in a middle section to engage with internal screw threads 131 of a valve cap 13. The valve cap 13 has a top end with a plurality of air apertures 132 formed thereon and a plug 133 extended downwards, and a conical bottom end. The valve cap 13 may be engaged with the air duct 12 in various degrees through screwing to allow the air duct 12 open or close to inflate or deflate the air mattress. However, when in use, a number of situations often incurred as will be discussed below.

During deflating and folding the air mattress, the valve cap 13 of the air faucet 10 is turned loose to move the plug 133 away from the air duct 12, the air apertures 132 of the valve cap 13 communicate with the air duct 12. When the air mattress 14 is squeezed, air in the air mattress will be discharged through the air duct 12 and air apertures 132. However during deflating process, users have to depress the folded portion of the air mattress with hands or feet, otherwise external air will enter through the opening air faucet 10 to inflate the air mattress 14 again. It is a cumbersome operation, especially to novices or casual users.

SUMMARY OF THE INVENTION

In view of aforesaid disadvantages, it is a primary object of the invention to provide an improved air faucet that allows a deflating and folding air mattress to discharge air without suction. The invention mainly includes a control valve in the valve cap. Through adjusting the fastening relationship between the valve cap and air duct, the control valve can control the open or close conditions between air apertures of the valve cap and an air inlet of the air duct thereby to allow the air mattress inflated or deflated as desired, and the air mattress may be deflated and folded effectively and conveniently.

The foregoing, as well as additional objects, features and advantages of the invention will be more readily apparent from the following detailed description, which proceeds with reference to the accompanying drawings.

DESCRIPTION OF THE PREFERRED EMBODIMENT

Figure 1:
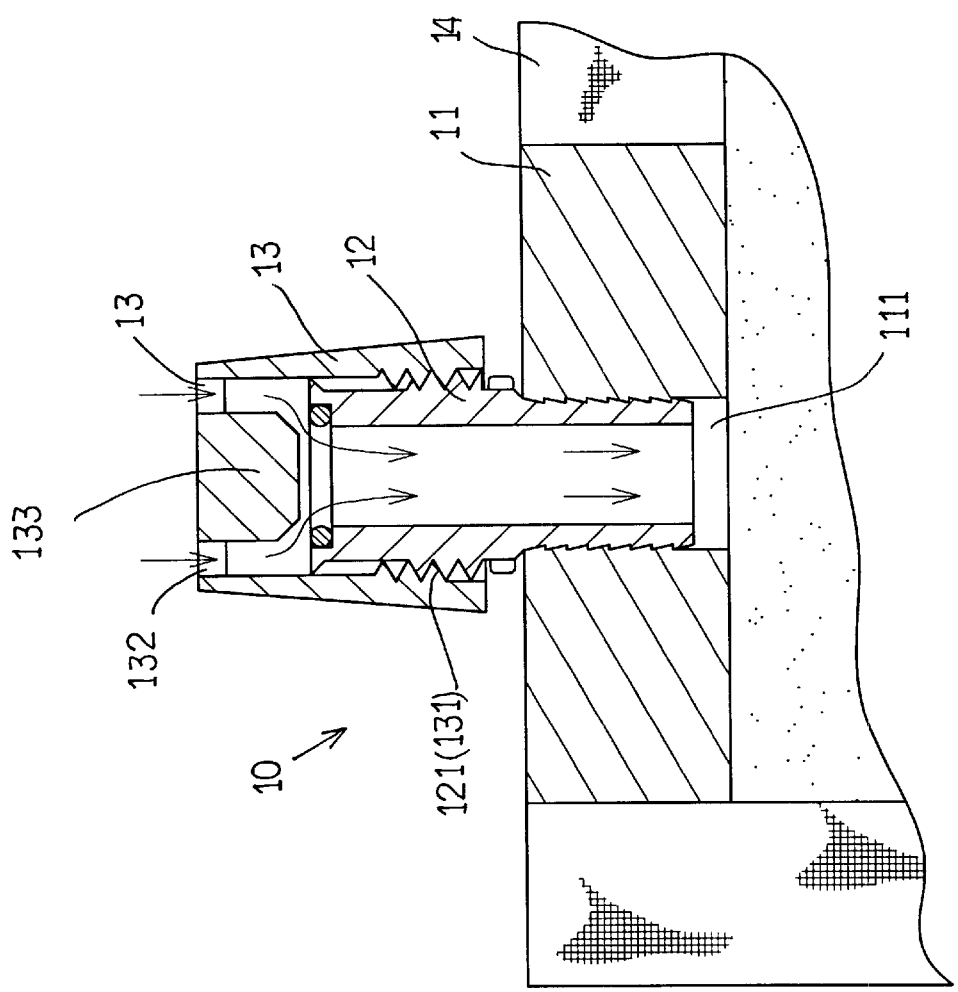
FIG. 1 is a schematic view of a conventional air faucet.
Figure 2:
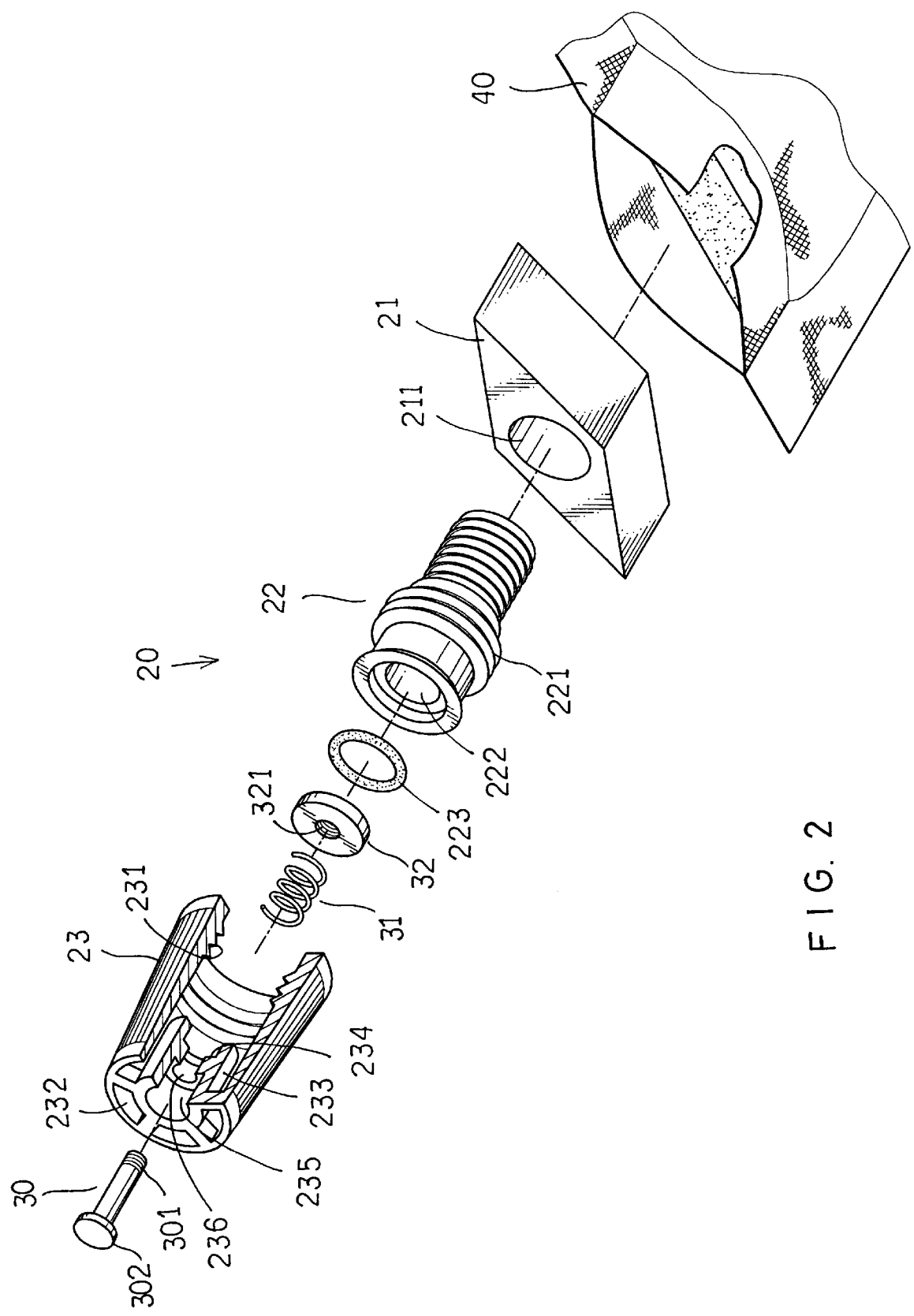
FIG. 2 is an exploded view of the invention.
Figure 3:
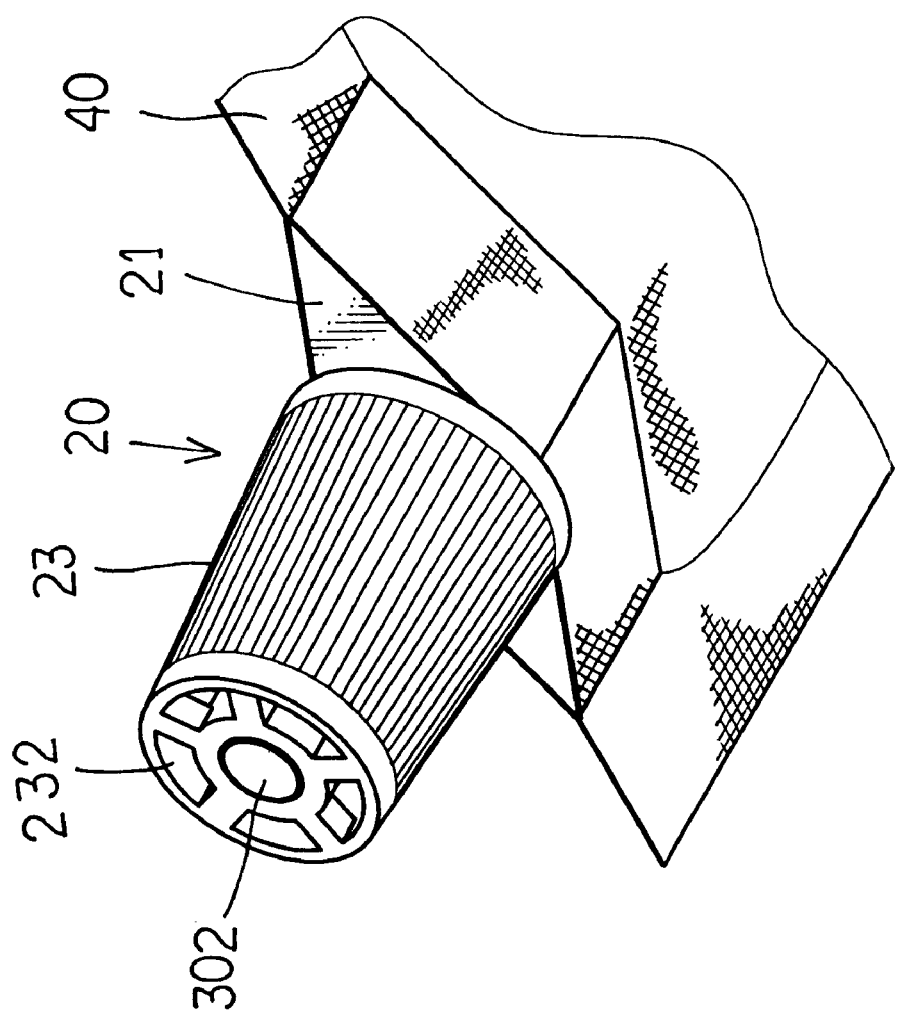
FIG. 3 is pictorial view of the invention.

Referring to FIGS. 2 and 3, the air faucet 20 of the invention includes an air duct 22 engaged with an opening 211 of a base seat 21 which is bonded to an air mattress 40. The air duct 22 has a middle section formed with external screw threads 221 for engaging with internal screw threads 231 formed on the inner peripheral surface of a valve cap 23. The air duct 22 further has an air inlet 222 which has a top end mounting a washer 223. The valve cap 23 has a top end which has a plurality of air apertures 232 formed thereon and a jutting strut 233 extended downwards in the center.

The jutting strut 233 has an indented recess 234 formed at the bottom end thereof and a cavity 235 formed at the upper section, and a through opening 236 to allow a control valve 30 to pass through. The control valve 30 couples with a spring 31 and has a screw section 301 at the bottom section to engage with a screw bore 321 of a valve cock 32. In certain embodiments, the bottom section of the control valve 30 may be secured to the cavity defined by the valve cock 32 by hypersonic means. The screw bore 321 has a close end to restrict the spring 31 between the valve cock 32 and indented recess 235 of the jutting strut 233. The valve cock 32 has a conical bottom end. The control valve 30 has a top end forming a retaining head 302. By means of the construction set forth above, the valve cap 23 may be fastened to the air duct 22 in various fashions to make the control valve 30 move therein in different selected ways as will be discussed below.

Figure 4:
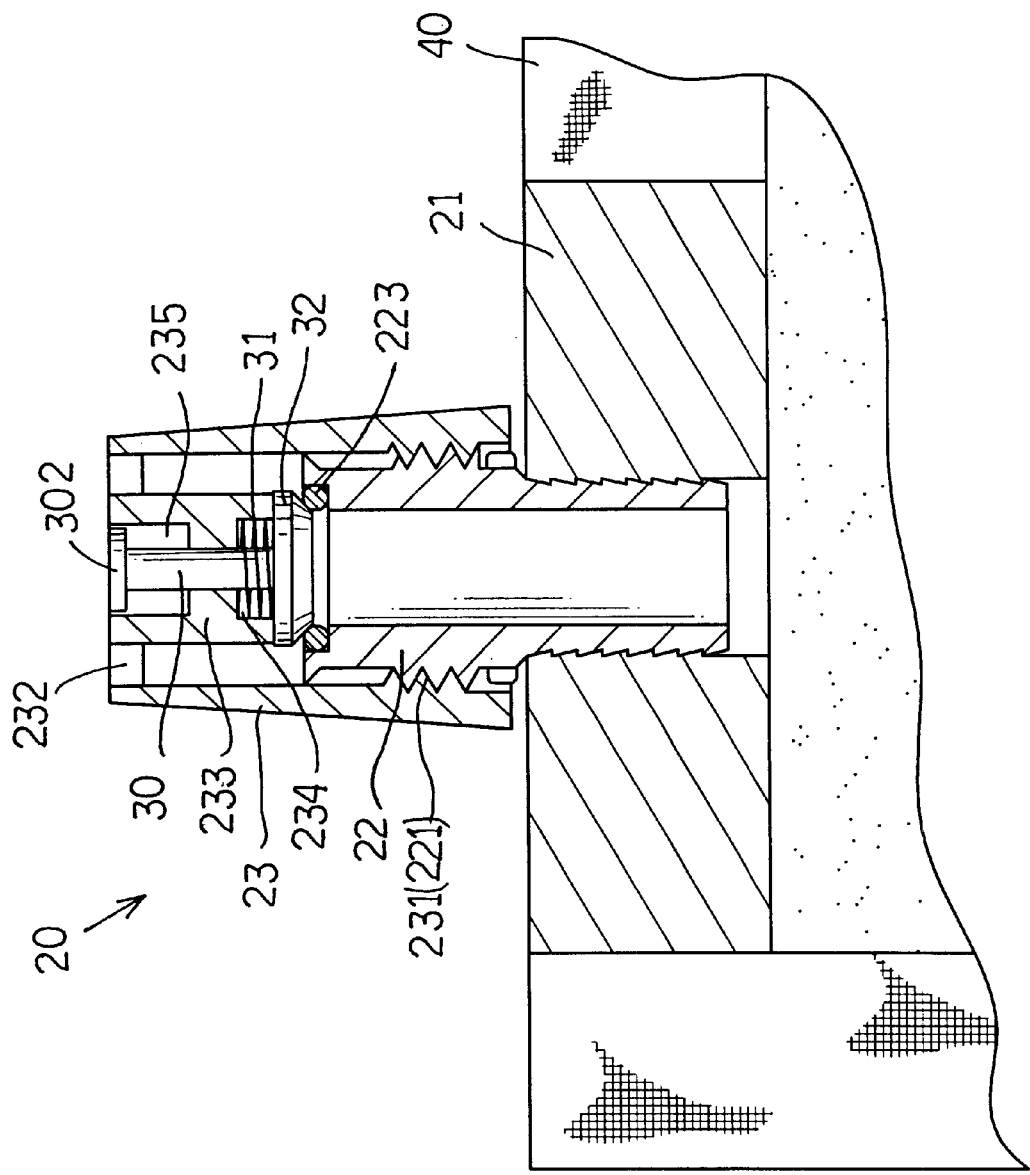
FIG. 4 is a schematic view of the invention, at one operative condition.

1. When the valve cap 23 is fastened tightly to the air duct 22, the valve cock 32 seals the top rim of the air inlet 222 of the air duct 22, hence air cannot enter or exit therethrough (as shown in FIG. 4), and the spring 31 of the control valve 30 is under a compression condition.

Figure 5:
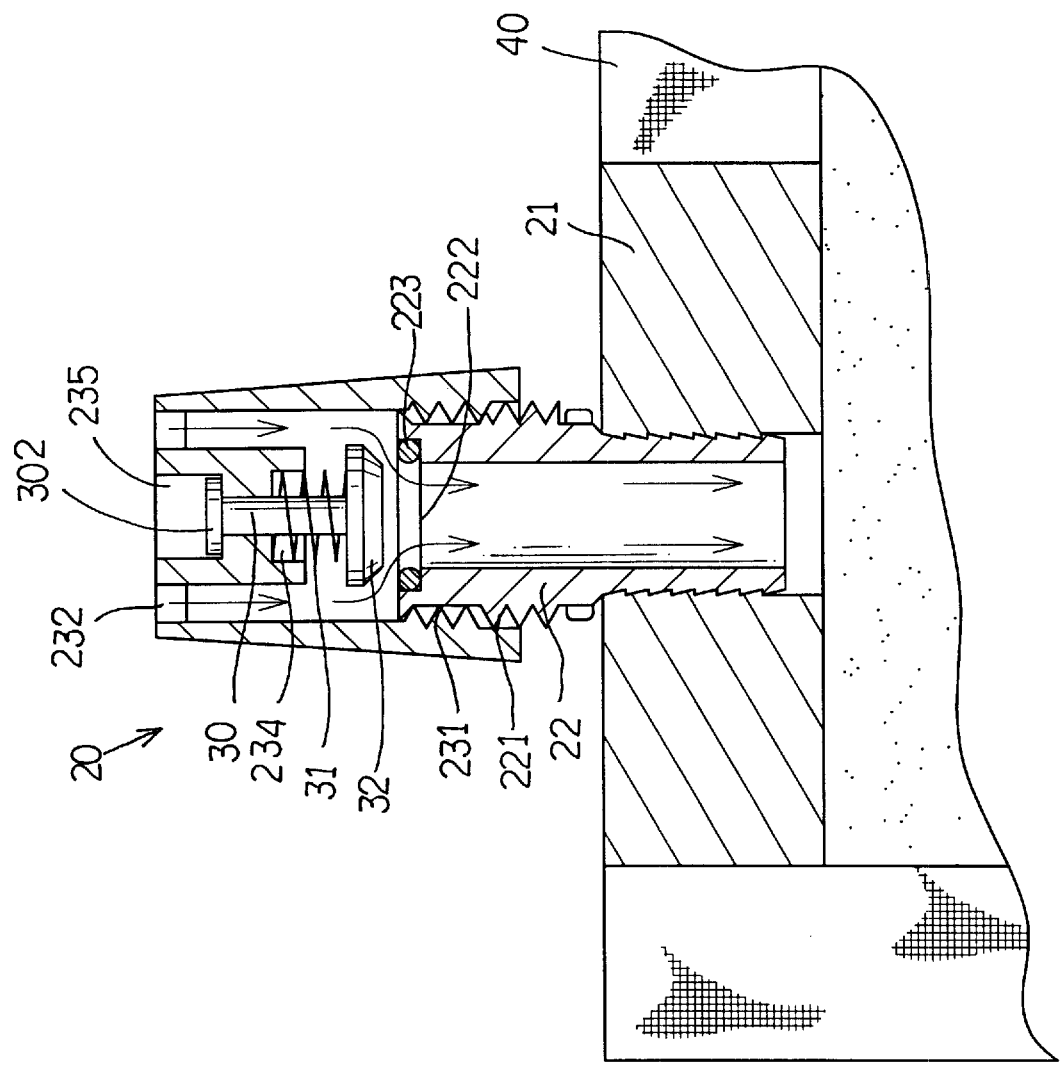
FIG. 5 is a schematic view of the invention, at another operative condition.

2. When the valve cap 23 is fully unfastened from the air duct 22, the internal screw threads 231 of the valve cap 23 are moved above the external screw threads 221 of the air duct 22, and the valve cap 23 is moved up for a great displacement to allow the spring 31 extending and restoring its resilient force to move the control valve 30 downwards, but with the valve cock 32 spaced from the air duct 22 to allow the air apertures 232 of the valve cap 23 forming a communication condition with the air inlet 222 of the air duct 22, thus air may be entered to inflate the air mattress 40 (as shown in FIG. 5).

Figure 6:
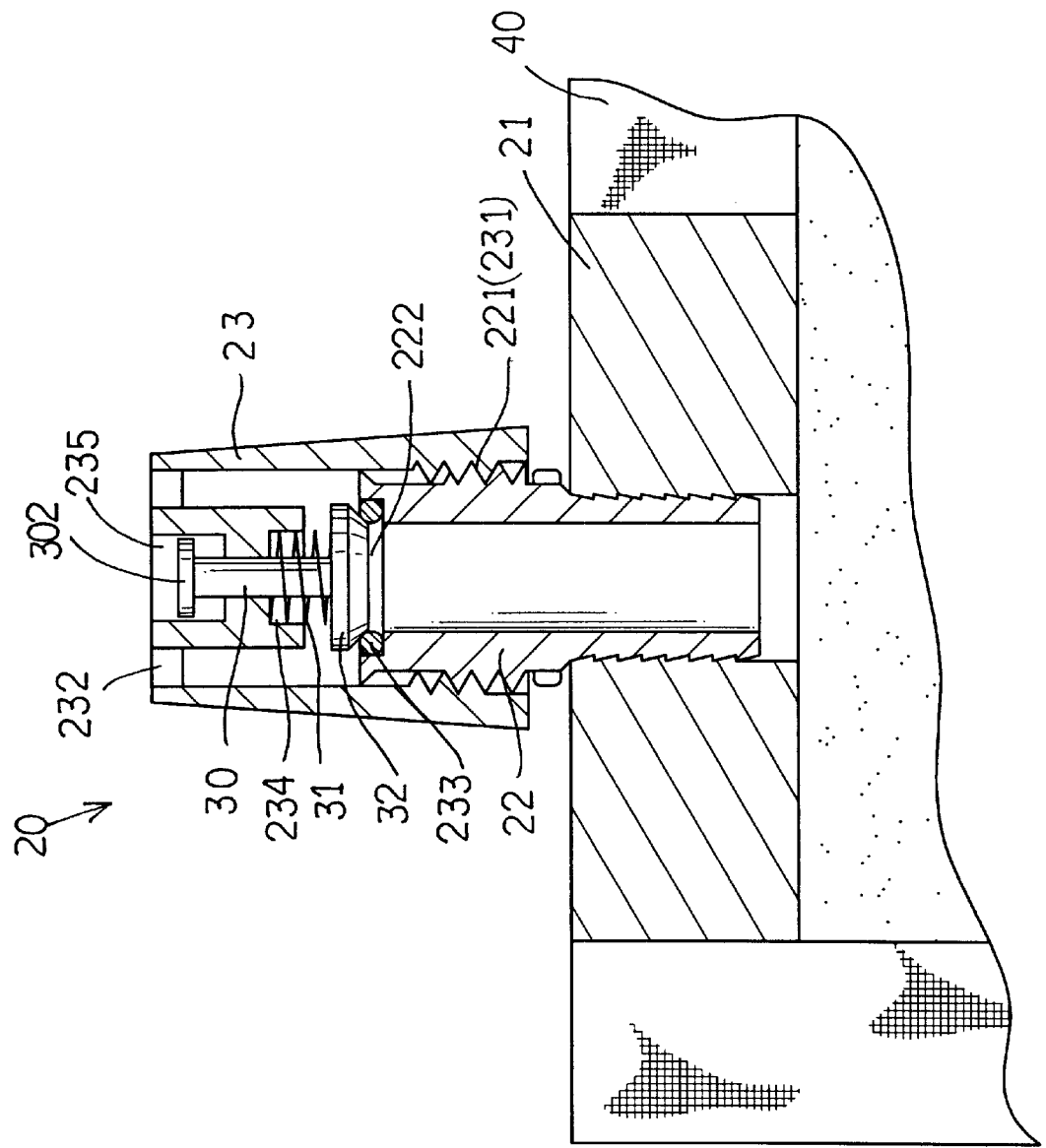
FIG. 6 is a schematic view of the invention, at yet another operative condition.
Figure 7:
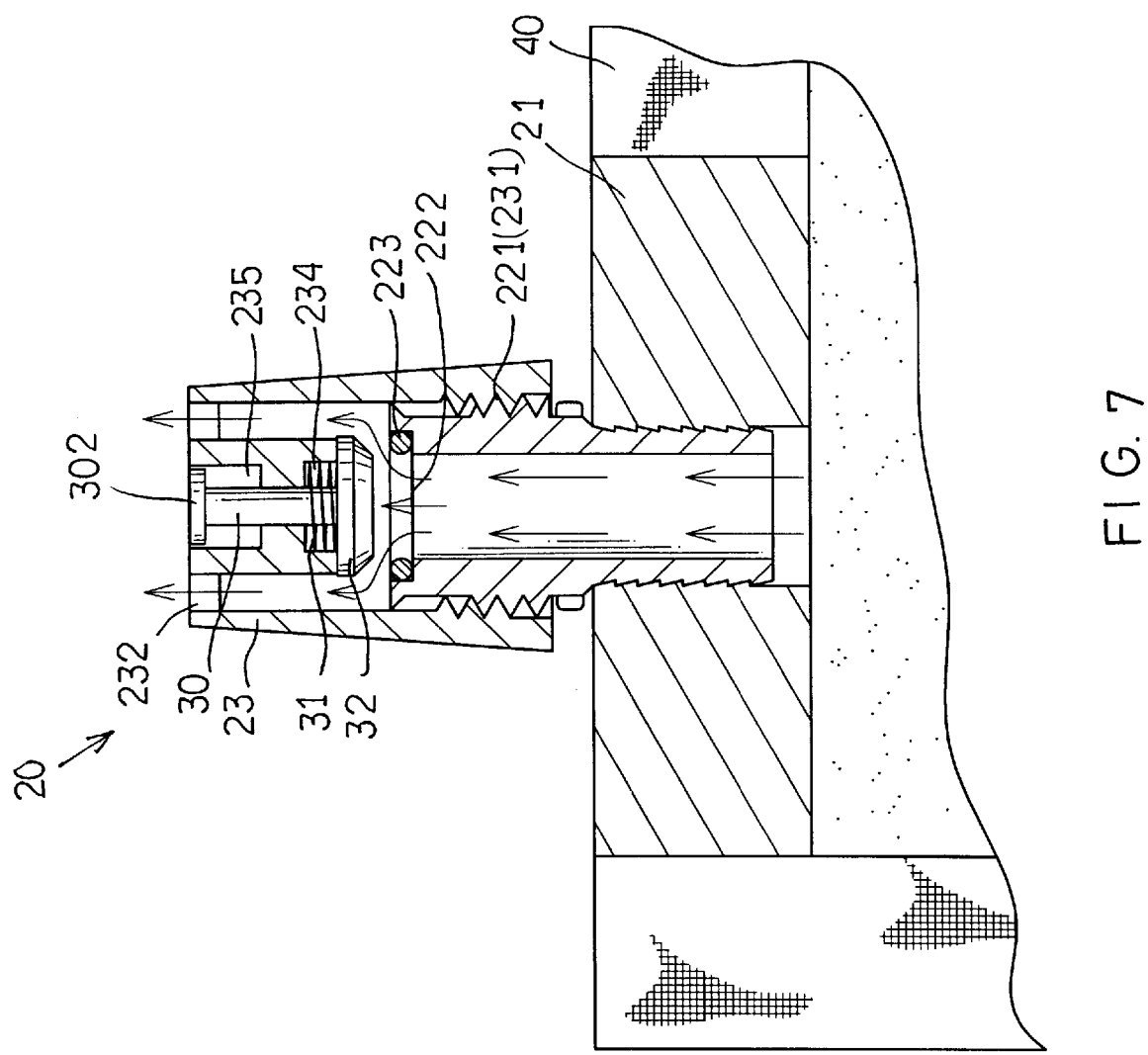
FIG. 7 is a schematic view of the invention, at still another operative condition.

3. When the valve cap 23 is fastened halfway relative to the air duct 22, the valve cap 23 is moved up for a limited displacement, and the spring 31 also is extended halfway. The control valve 30 is extended downwards by the spring 31 to seal the air inlet 222 of the air duct 22 (as shown in FIG. 6). When the air mattress 24 is squeezed, a large amount of air will be discharged at a fast speed to the air faucet 20 to push the control valve 30 and valve cock 32 upwards because of the spring 31 not being fully extended. The air apertures 232 of the valve cap 23 communicate with the air inlet 222 of the air duct 22 to allow the air in the air mattress 40 to escape (as shown in FIG. 7). Whereas, when the air mattress 40 is not being squeezed, air does not flow and push the control valve, the control valve 30 will be pushed by the spring 31 to make the valve cock 32 sealing the air inlet 222 of the air duct 22 again (as shown in FIG. 6). Hence external air will be prevented from flowing into the air mattress 40 to make contracting and folding of the air mattress easier.

Moreover, the cavity 235 of the valve cap 23 is designed to encase the control valve 30 without extruding outside when it is moved upwards.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

I claim:

1. An improved air faucet, comprising:

an air duct engaged with an opening of a base seat having a middle section formed with external screw threads and an air inlet formed in the interior thereof and a washer located on the air duct above the air inlet, the base seat being bonded to an air mattress; and a valve cap having internal screw threads formed on the inner peripheral surface thereof to engage with the external screw threads of the air duct, a top end which has a plurality of air apertures formed thereon and a jutting strut extending downwards in the center thereof;

wherein the jutting strut of the valve cap has an indented recess formed at the bottom end thereof, a cavity formed at an upper section thereof, and a through opening to allow a control valve to pass through, the control valve being coupled with a spring and having a bottom end engaged with a valve cock which has a conical bottom end thereby to restrict the spring between the valve cock and the indented recess;

wherein the valve cap is fastened to the air duct in selected ways to allow the air apertures of the valve cap and the air inlet of the air duct selectively forming communicating or sealing conditions.

2. The improved air faucet of claim 1, wherein the valve cap is fastened tightly to the air duct such that the spring of the control valve is under compression and the valve cock seals the air inlet of the air duct to prevent inflation and deflation.

3. The improved air faucet of claim 1, wherein the valve cap is fully unfastened from the air duct to move the valve cap upwards for extending the spring to space the valve cock from the air duct to allow air entering into the air mattress for inflation.

4. The improved air faucet of claim 1, wherein the valve cap is fastened halfway relative to the air duct to move the valve cap upwards for a selected displacement to extend the spring in a selected manner to allow the valve cock sealing the air inlet such that squeezing the air mattress will result in air contained therein pushing the control valve and moving the valve cock upwards to allow the air apertures of the valve cap communicating with the air inlet of the air duct for discharging air and deflating the air mattress.

5. The improved air faucet of claim 1, wherein the control valve has a top end formed a retaining head.

6. The improved air faucet of claim 1, wherein the control valve has one end formed a screw section, the valve cock having a close end screw bore formed thereon to engage with the control valve.

7. The improved air faucet of claim 1, wherein the control valve has one end fastened to a cavity formed on the valve cock by a hypersonic means.

\* \* \* \* \*